United States Patent
Fails et al.

(10) Patent No.: US 11,172,563 B1
(45) Date of Patent: Nov. 9, 2021

(54) WIRELESS DMX

(71) Applicant: City Theatrical, Inc., Carlstadt, NJ (US)

(72) Inventors: Gary Fails, Tappan, NY (US); Paul Kleissler, Englewood, NJ (US); Philip Nye, Bournemouth (GB)

(73) Assignee: CITY THEATRICAL, INC., Carlstadt, NJ (US)

( * ) Notice: Subject to any disclaimer, the term of this patent is extended or adjusted under 35 U.S.C. 154(b) by 0 days.

(21) Appl. No.: 15/788,169

(22) Filed: Oct. 19, 2017

Related U.S. Application Data

(60) Provisional application No. 62/410,109, filed on Oct. 19, 2016, provisional application No. 62/410,100, filed on Oct. 19, 2016.

(51) Int. Cl.
| | |
|---|---|
| *H04W 72/00* | (2009.01) |
| *H04W 72/04* | (2009.01) |
| *H05B 47/19* | (2020.01) |
| *H04Q 11/04* | (2006.01) |
| *H04L 5/16* | (2006.01) |
| *H04W 52/02* | (2009.01) |
| *H04L 29/08* | (2006.01) |

(52) U.S. Cl.
CPC .............. *H05B 47/19* (2020.01); *H04L 5/16* (2013.01); *H04Q 11/0421* (2013.01); *H04W 52/0216* (2013.01); *H04W 72/005* (2013.01); *H04W 72/0446* (2013.01); *H04L 67/12* (2013.01); *H04Q 2213/13393* (2013.01)

(58) Field of Classification Search
CPC ............ H05B 37/0272; H05B 37/0245; H05B 37/0209; H05B 37/02; H04W 72/0446; H04W 72/044; H04W 72/04; H04W 72/005; H04W 52/0216; H04W 52/0212; H04W 52/0209; H04W 52/02; H04Q 11/0421; H04Q 11/04; H04Q 2213/13393; H04L 5/16; H04L 5/14; H04L 67/12
USPC .......................................... 370/311
See application file for complete search history.

(56) References Cited

U.S. PATENT DOCUMENTS

| | | | | |
|---|---|---|---|---|
| 5,535,200 A | * | 7/1996 | Gardner | H04J 3/12 370/410 |
| 7,432,803 B2 | * | 10/2008 | Fails | G08C 17/02 340/4.3 |
| 7,657,234 B2 | * | 2/2010 | Qu | H04W 72/005 370/328 |
| 10,210,750 B2 | * | 2/2019 | Knapp | G08C 23/04 |
| 2005/0286646 A1 | * | 12/2005 | Fails | H04J 13/00 375/259 |

(Continued)

*Primary Examiner* — Jeffrey M Rutkowski
*Assistant Examiner* — Luna Weissberger
(74) *Attorney, Agent, or Firm* — Myers Wolin, LLC

(57) ABSTRACT

A system and method are provided for wireless data broadcasting. The system provides a hub for broadcasting data wirelessly to a plurality of end devices, such as light fixtures, and a plurality of nodes for retrieving at least a portion of the data broadcasted from the hub. Each node is associated with at least one corresponding end device, and transmits data retrieved to the end device. A method is provided for broadcasting the data using the system. The method includes interrogating the nodes and determining what data is required by the corresponding end devices. The hub then packetizes, in RF packets, the required data and transmits data to each of several nodes.

15 Claims, 4 Drawing Sheets

(56) References Cited

U.S. PATENT DOCUMENTS

| | | | | |
|---|---|---|---|---|
| 2005/0289279 | A1* | 12/2005 | Fails | H05B 47/18 |
| | | | | 710/315 |
| 2007/0286600 | A1* | 12/2007 | Guo | H04B 10/1143 |
| | | | | 398/43 |
| 2007/0292135 | A1* | 12/2007 | Guo | H04B 10/1143 |
| | | | | 398/106 |
| 2008/0170601 | A1* | 7/2008 | Fails | H04B 1/713 |
| | | | | 375/132 |
| 2011/0023012 | A1* | 1/2011 | Khader | G06F 8/10 |
| | | | | 717/106 |
| 2011/0280251 | A1* | 11/2011 | Fails | H05B 47/18 |
| | | | | 370/401 |
| 2014/0365702 | A1* | 12/2014 | Ray | G06F 13/4068 |
| | | | | 710/305 |
| 2016/0095182 | A1* | 3/2016 | Bjorn | H05B 47/19 |
| | | | | 315/149 |
| 2016/0234912 | A1* | 8/2016 | Smith | H05B 47/19 |

* cited by examiner

WIRELESS DMX

CROSS REFERENCE TO RELATED APPLICATIONS

This application claims the benefit of provisional application U.S. 62/410,109 and provisional application U.S. 62/410,100, both filed on Oct. 19, 2016, the entire contents of each of which is incorporated herein by reference.

FIELD OF THE INVENTION

This disclosure relates to wireless data transfer systems capable of transporting large amounts of data efficiently, typically for use in, for example, entertainment or architectural lighting systems.

BACKGROUND

With the rise of LED lighting, all DMX (Digital Multiplexing) lighting fixtures must be provided with data as well as power, and the need for data distribution in and across lighting systems has grown. Distributing data over wires is time consuming and expensive, and requires extensive set up and wiring specific to any particular installation. Therefore, wireless systems provide advantages over wired systems While wireless systems exist, with some systems leveraging a protocol known as Remote Device Management (RDM), these systems are limited in a wide variety of ways. For example DMX for lighting is typically implemented using a "DMX 512" standard, which includes 512 DMX slots to control various aspects of a lighting installation. Wireless DMX systems are typically limited to a maximum of one "universe" of data, i.e., 512 DMX. In existing systems, when multiple "universes" of data are required, hardware is typically duplicated.

Therefore, providing wireless DMX to systems larger than 512 slots requires the use of multiple transmitters for each additional 512 slots to be transmitted. Duplicating the hardware, i.e. transmitters, requires a larger physical footprint, resulting in larger and more power hungry chipsets, as well as a larger RF footprint. These solutions often fail due to this excessive RF footprint, particularly when the venue has other wireless systems that have to operate at the same time within limited bandwidth. The additional transmitters emit so much RF power, that other systems may fail to operate.

With the overcrowding of unlicensed RF spectrum, the ability to use spectrum efficiently is important. Duplicating hardware to control multiple lighting fixtures results in using more of the RF spectrum then necessary, and in turn results in interference.

Further, in typical installations, it is not known to the controller which of the 512 available DMX slots are in use at any given time, and therefore, data for all 512 slots are broadcast at all times.

Modern lighting fixtures also typically include features that leverage two way communications, and therefore have the ability to "talk back" to their controllers. Existing wireless systems interrupt the DMX data broadcast in order to deliver the talkback data, resulting in interruptions of the DMX data delivery for a time period that is longer than that of a wired system. This approach results in slow talkback and DMX timing alterations that can be seen when using LED light fixtures. To get around the slow talkback data associated with half-duplex RDM, existing systems employed RDM controllers built into the transmitters, but these systems cannot recognize devices that are connected prior to the wireless transmitter providing only a partial solution. Further, it is not desirable to have multiple RDM controllers running in a system simultaneously. Therefore, a user is left using a system with a single RDM controller that is not built into the transmitter that can see the whole network. All devices on the wireless link will be very slow to respond hampering adoption and use of larger wireless systems, as a larger system with more lighting installations would further exacerbate the problem.

SUMMARY

A system is provided for broadcasting data, such as that used for Digital Multiplexing (DMX) and may transmit data in greater quantities or with more efficiency than existing systems. For example, such a system may broadcast Remote Device Management (RDM) protocol talkback data time multiplexed with DMX control data. Such a system allows the DMX data to be transferred during this talkback without interruption.

Further, a system is provided that interrogates devices utilizing RDM data in order to determine what DMX slots are needed, and then transmits only the DMX slots used out of the 512 slots available from a given universe. Accordingly, a broadcast associated with a first universe of data may utilize fewer than the 512 slots allocated. Such a system may further use bandwidth allocated to unused slots to broadcast DMX data associated with a second universe of data.

A system in accordance with an example embodiment may broadcast data associated with several universes of data simultaneously, and can allocate fewer than the standard 512 slots to each universe. Accordingly, hardware capable of broadcasting 512 DMX slots may be able to allocate those slots to multiple universes and, for example, broadcast 256 slots to each. Similarly, where hardware is provided that can broadcast several traditional universes worth of slots, such as 2560 slots, those slots may be broken apart and allocated to any number of universes of DMX data.

Accordingly, the systems disclosed makes it possible to utilize a chip inside a lighting fixture coupled to a transceiver that can broadcast more data than ever before, opening up the potential of all wireless lighting systems. Further, an ability to handle more data in a single RF footprint would result in less overcrowding of available RF spectrum, which in turn means more devices can be controlled wirelessly and less interference would result.

Such a system provides a hub for broadcasting data wirelessly to a plurality of end devices, such as light fixtures, and a plurality of nodes for retrieving at least a portion of the data broadcasted from the hub. Each node is associated with at least one corresponding end device, and transmits data retrieved to the end device.

A method is provided for broadcasting data using the system. The method includes interrogating the nodes and determining what data is required by the corresponding end devices. The hub then packetizes, in RF packets, the required data and transmits data to each of several nodes.

DETAILED DESCRIPTION OF THE PREFERRED EMBODIMENTS

Figure 1A:
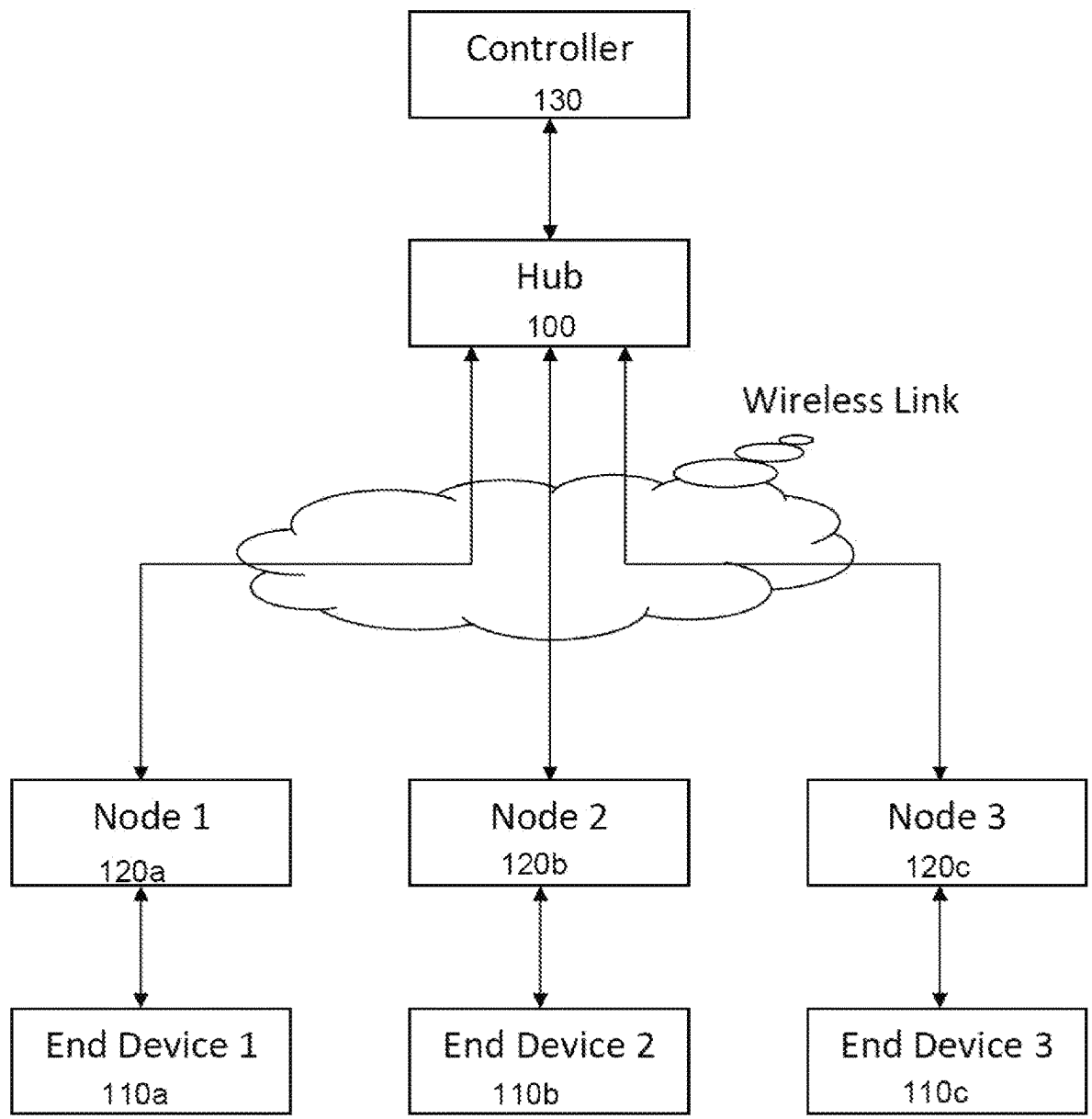
FIG. 1A is a schematic diagram for a system implementing a wireless DMX method in accordance with this disclosure.

The description of illustrative embodiments according to principles of several illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits are illustrated by reference to certain exemplified embodiments and may not apply to all embodiments. Accordingly, the invention expressly should not be limited to such exemplary embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A system and corresponding method are provided to efficiently wirelessly control wireless installations, such as wireless lighting installations. The system may consist of multiple instances of a single RF transceiver design, which can operate as a hub or node. Hubs are masters and nodes are slaves. Hubs receive data from controllers and transfer data to nodes, nodes transfer data to end devices. Hubs control the flow of data to nodes. Nodes can only respond when asked to by the Hub.

Nodes interrogate end devices for the number of slots they require. Hubs interrogate nodes to determine which slots they require in order to control the corresponding device. Using this information, hubs select the proper data slots from the controller and package them into RF packets.

RDM may be time multiplexed with the DMX slot data as to not interfere with the timely delivery of DMX slot data. Rather than broadcasting RDM messages to all nodes, the message is unicast to specific nodes that require the message. This allows nodes that are not interested in the message to continue slot data processing.

Figure 1B:
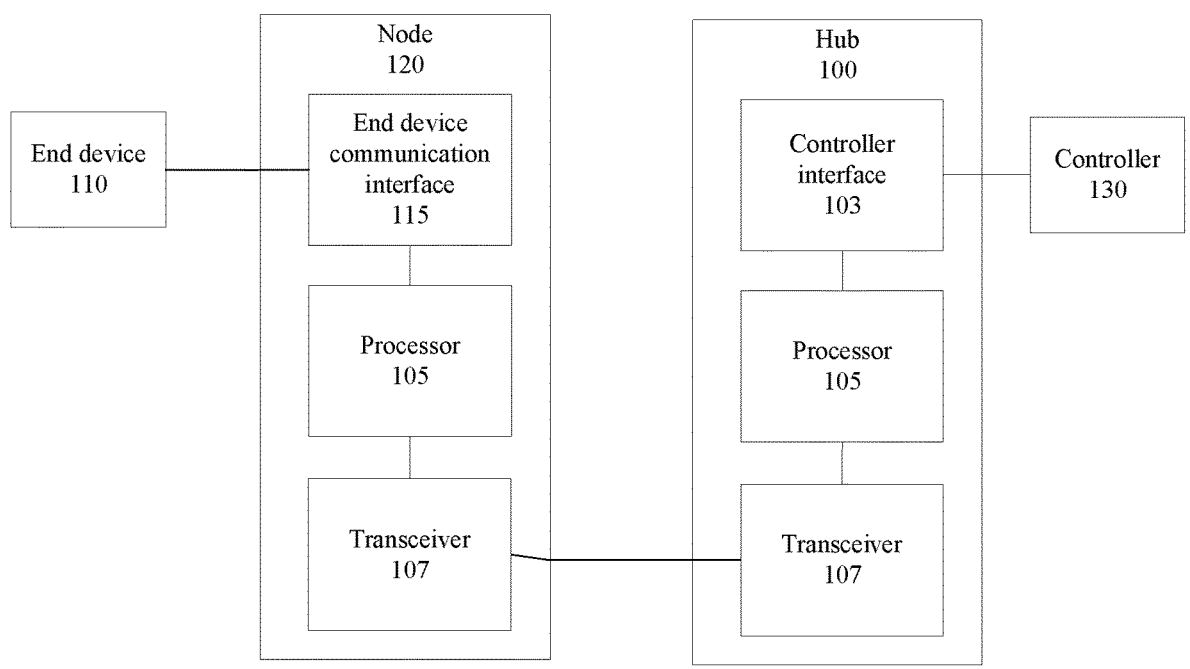
FIG. 1B is a schematic diagram for a single hub and a single node in the system of FIG. 1A.

FIG. 1A shows a system implementing wireless DMX in accordance with this disclosure. FIG. 1B shows a simplified schematic diagram illustrating a single node controlling a single end device in a wireless DMX system.

As shown in the figures, a system for wireless data broadcasting is provided, which includes a hub 100 for broadcasting data for controlling several end devices 110a, b, c. Each of the end devices has a node 120a, b, c for receiving broadcasts from the hub and transmitting them to the corresponding end device.

The system described may be used to control a variety of electronic devices 120, such as lighting systems for theaters. Accordingly, data may be transmitted from a controller 130 to the end devices 110 using traditional control protocols, such as DMX. In order to facilitate a wireless transmission, the controller 130 may provide control data, such as data representing a user command, to a controller interface 103 of the hub 100. A transceiver 107 of the hub 107 may then, in turn, broadcast at least a relevant portion of that control data to a corresponding transceiver 107 of a node 120a associated with an end device 110a that the user chooses to control. The node 120a may then transmit the control data to the end device 110 using an end device communication interface 115.

In order to facilitate such a control scheme, the hub 100 may interrogate, or query, each of the nodes 120a to determine data requirements associated with the corresponding end device 110a. For example, where a DMX protocol is used to control theater lights, the end device 110a may be a first theater light requiring several DMX slots in a first DMX 512 universe. Accordingly, the node 120a will respond to the interrogation with an identification of the DMX 512 universe and the particular slots required.

When a user chooses to transmit control data to the end device 110a, the user therefore indicates, at the controller 130, the command he would like to transmit. The controller 130 then provides that command, including an identification of the device that should receive the command, to the controller interface 103 of the hub 100.

In some embodiments, the hub 100 may inspect the command and determine if the command is new. In such an embodiment, the hub 100 may discard any commands that were previously transmitted, or that were transmitted within a specified period of time. In this way, the hub 100 may preserve available bandwidth by preventing the packaging and transmission of duplicative messages.

The hub then packages, at a processor 105, only the DMX slots required by the first device 110a into an RF packet and transmits the packet to the first node 120a using the transceivers 107 associated with each respective device. The first node 120a in turn identifies the data contained in the RF packet at its own processor 105, and provides the data corresponding to the required DMX slots to the first device 110 using the end device communication interface 115.

Various wireless radio technologies may be used to transmit the RF packets described in reference to the system. These may include, for example, Wi-Fi technologies. In some embodiments, Bluetooth technology may be used for communications between the hub 100 and the nodes 120. In such an embodiment, the processor 105 of the node 120 may receive and interpret and processing instructions or other data received at the transceiver 107, and the processor 105 of the hub 100 may prepare data and/or instructions for transmission at the transceiver. As discussed above, the hub 100 and node 120 may be implemented in the same hardware, and as such, the same interface may be used for a controller interface 103 and an end device communication interface 115. Alternatively, multiple interfaces may be provided, and the hardware device may be assigned a role as either a hub 100 or a node 120 depending on which interface is being used at any time.

Figure 2:
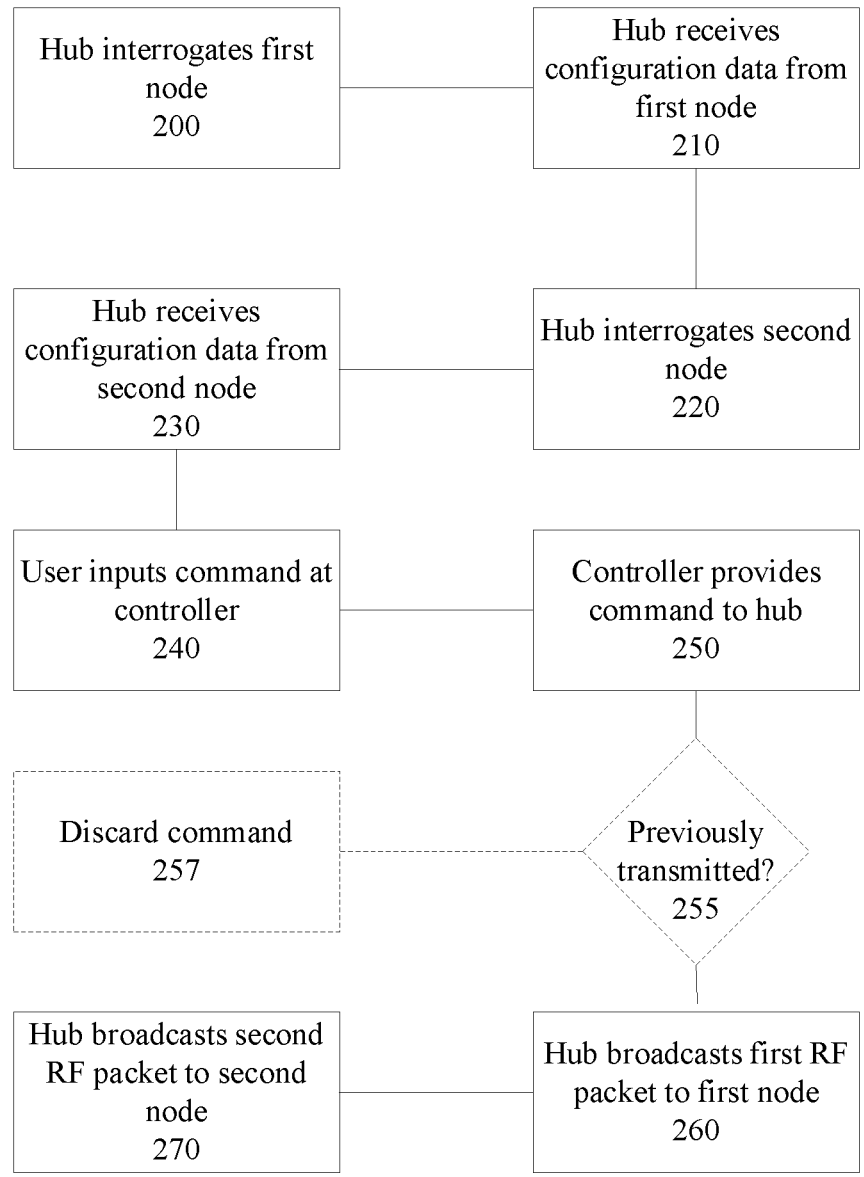
FIG. 2 is a flowchart illustrating a method for wireless data broadcasting in accordance with this disclosure.

FIG. 2 is a flowchart illustrating a method for wireless data broadcasting in accordance with this disclosure. The method described is discussed in reference to the system shown in FIG. 1. As shown, the hub 100 first interrogates the first node 120a in order to determine particular DMX slots required by the first end device 110a (200). The hub 100 then receives, from the first node 120a, information regarding data requirements for the corresponding first end device 110a (210). This information may include, for example, configuration data including an indication of DMX slots in a first universe required by the first end device 110a.

The hub 100 then interrogates the second node 120b to determine any DMX slots required by the second end device 110b (220) and receives, from the second node 120b, information regarding data requirements for the corresponding second end device 110b, such as an indication of DMX slots in a second universe required by the second end device (230).

A user then utilizes the system to control either the first end device 110a or the second end device 110b. In doing so, the user inputs a command at the controller 130 (240) which in turn provides the command to the hub 100 along with an identification of the end device 110 to which the command is to be applied (250). In the presently described method, the user command includes instructions to be sent to both the first and second end devices 110a, b. In some case, the instruction may be the same to each end device 110, such as an instruction to dim two lights in unison. Alternatively, the instructions may differ, so as to target each of two lights differently, for example. Alternatively, the command may include instructions for one of the end devices 110, and in such a case, the hub 100 sends an RF packet to only one of the nodes 120.

In some embodiments, the hub 100 then inspects the command, and determines if has been previously transmitted (255). This may be comparing the command to recently processed commands, such as commands processed and transmitted within a threshold period of time. In such an embodiment, the hub 100 may discard (257) any command determined to be duplicative of a previously sent command.

The hub 100 then packages and broadcasts (260) a first RF packet to the first node 120a, the packet comprising only the DMX data corresponding to the DMX slots in the first DMX universe required by the first end device 110a. Finally, the hub 100 packages and broadcasts (270) a second RF packet to the second node 120b comprising only the DMX data corresponding to the DMX slots in the second DMX universe required by the second end device 110b.

Figure 3:
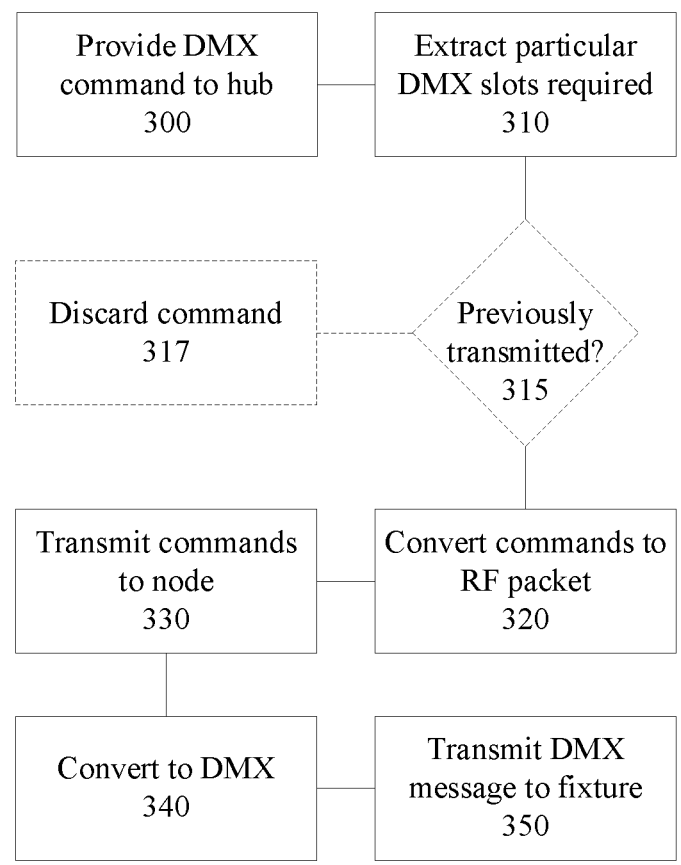
FIG. 3 is a flowchart illustrating a method for implementing Bluetooth transmissions in the method of FIG. 2.

In some cases, the RF packet may be a specified RF packet, such as a Bluetooth packet. A method for such an embodiment is shown in FIG. 3. As shown, in such cases, the command may be provided by the controller 130 to the controller interface 103 of the hub 100 in a fixture specific format, such as DMX (300). In such an embodiment, the particular DMX slots required by the fixture for which the command is intended, such as the first end device 110a, may be extracted for transmission (310) and converted to a required RF format, such as Bluetooth (320) at the processor 105 of the hub 100 to create an RF packet in preparation for transmission.

In some embodiments, prior to converting the provided command to Bluetooth (at 320), the command is first inspected, to determine if it has been previously transmitted (315), or is duplicative of a command that has been previously transmitted. If the command is determined to be duplicative, it is discarded (317) prior to conversion to the desired format, in this case Bluetooth.

The message, in the form of an RF packet, is then transmitted from the transceiver 107 of the hub 100 to the transceiver 107 of the node 120. The message is then converted back to DMX format at the processor 105 of the node 120 (340) and transmitted in DMX format to the associated end device 110, such as a fixture (350).

In some embodiments, the controller 130 and hub 100 may be combined in a single housing, and may be provided as a portable and compact package. In some embodiments, the features described, including the ability to broadcast data across multiple DMX universes may be provided in a single radio chip. In some embodiments, the circuitry for the controller and/or hub may be incorporated into controllers or fixtures directly, so as to implement a system having on-board or retrofitted wireless capabilities.

In some embodiments, the hub 100 may be able to broadcast five, or more, universes of data in the 2.4 GHz radio band. In some embodiments, the hub 100 may be able to broadcast up to four universes of data in the 900 MHz band. In some embodiments, a single node 120 may serve multiple end devices 110 or fixtures hardwired to the same node. Alternatively, a single node 120 may serve to relay signals to a secondary node placed outside of wireless range of the hub 100.

As discussed above, the hub 100 described may broadcast RDM, which would not disrupt the transmission of a DMX broadcast. As described, the system may combine DMX slots from multiple streaming ACN and/or DMX universes into a single broadcast. The system may also allow the tuning of a broadcast to maximize an available number of DMX slots or maximize fidelity, or maximize RDM effectiveness depending on the needs of a particular installation. The system described may be used to add wireless DMX to existing products, and allows for retrofitting to existing device designs.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for wireless data broadcasting comprising:
   a hub for broadcasting data wirelessly to a plurality of end devices;
   a plurality of nodes for retrieving at least a portion of the data broadcasted from the hub;
   wherein each node of the plurality of nodes is associated with at least one corresponding end device of the plurality of end devices,
   wherein each node of the plurality of nodes contains a specification of data requirements comprising an identification of data slots used in a corresponding Digital Multiplexing (DMX) universe for a corresponding one of the plurality of end devices, wherein the data requirements identify a subset of the data slots in the corresponding DMX universe, and wherein each node provides such information to the hub upon an interrogation from the hub, and wherein, after receiving the specification of the subset of the data slots from a first node, the hub transmits a first message to the first node corresponding to a first end device, the first message comprising only the data for the subset of the data slots specified in the data requirements of the first end device, and wherein the first message is formed by converting the subset of the data slots specified in the data requirements of the first end device into an RF packet comprising the subset of the data slots.

2. The system of claim 1, wherein the hub broadcasts a second message to a second node corresponding to a second end device, the second message comprising only the data for the subset of the data slots specified in the data requirements of the second end device.

3. The system of claim 1, wherein the first message is generated upon receiving a command from a user for the end device, and wherein the first message comprises only the subset of the data slots required to execute the command at the first end device.

4. The system of claim 1, wherein each of the plurality of end devices is a light fixture, and wherein the data requirements are a specification of the subset of the data slots used in a corresponding DMX universe.

5. The system of claim 4, wherein the hub is integrated into a controller, and wherein at least one of the plurality of nodes is integrated into the corresponding light fixture.

6. The system of claim 1, wherein the hub is configured to receive Remote Device Management (RDM) data from the first node.

7. The system of claim 1, wherein after receiving the RF packet, the first node identifies the subset of the data slots in the RF packet and transmits the subset of the data slots specified in the data requirements of the first end device to the first end device.

8. The system of claim 1, wherein the RF packet is created only after confirming that the first message is not duplicative of a previously broadcasted message.

9. A method for wireless data broadcasting, the method comprising:
providing a hub for broadcasting data wirelessly from a controller;
providing a first node associated with a first end device; and
providing a second node associated with a second end device;
interrogating the first node using the hub;
receiving from the first node, at the hub, an indication of Digital Multiplexing (DMX) slots in a first DMX universe required by the first end device, wherein the DMX slots required by the first end device are a subset of the slots in the first DMX universe;
interrogating the second node using the hub;
receiving from the second node, at the hub, an indication of DMX slots in a second DMX universe required by the second end device, wherein the DMX slots required by the second end device are a subset of the slots in the second DMX universe;
creating and broadcasting a first RF packet to the first node comprising only the subset of the DMX slots in the first DMX universe required by the first end device; and
creating and broadcasting a second RF packet to the second node comprising only the subset of the DMX slots in the second DMX universe required by the second end device.

10. The method of claim 9, further comprising:
converting a first user command to a first representation in the subset of the DMX slots required by the first end device;
packaging the first representation into the first RF packet;
receiving the first RF packet at the first node;
identifying the subset of the DMX slots in the first RF packet; and
transmitting the subset of the DMX slots to the first end device.

11. The method of claim 10, further comprising:
Converting the first user command to a second representation in the subset of the DMX slots required by the second end device;
packaging the second representation into the second RF packet;
receiving the second RF packet at the second node;
identifying, at the second node, the subset of the DMX slots in the second RF packet; and
transmitting the subset of the DMX slots to the second end device.

12. The method of claim 10, further comprising:
confirming, prior to converting the first user command to the first representation, that the first user command is not duplicative of a previously transmitted message.

13. The method of claim 9, wherein each of the first end device and the second end device are light fixtures.

14. The method of claim 9, further comprising:
confirming, prior to broadcasting the first RF packet, that the first RF packet is not duplicative of a previously transmitted message, and
confirming, prior to broadcasting the second RF packet, that the second RF packet is not duplicative of a previously transmitted message.

15. A system for wireless data broadcasting comprising:
a hub for broadcasting data wirelessly to a plurality of end devices;
a plurality of nodes for retrieving at least a portion of the data broadcasted from the hub;
wherein each node of the plurality of nodes is associated with at least one corresponding end device of the plurality of end devices,
wherein each node of the plurality of nodes contains information regarding data requirements of the corresponding one of the plurality of end devices, and wherein each node provides such information to the hub upon an interrogation from the hub,
wherein the hub generates and transmits a first message comprising an RF packet comprising data determined to be required by the one of the plurality of end devices based on the information regarding data requirements, and
wherein the RF packet is created only after confirming that the first message is not duplicative of a message previously transmitted to the one of the plurality of end devices.

* * * * *